United States Patent
Celli

(10) Patent No.: US 9,340,937 B2
(45) Date of Patent: May 17, 2016

(54) WHEELBARROW WAGON CONVERSION

(71) Applicant: Giuliano Celli, Woodbridge (CA)

(72) Inventor: Giuliano Celli, Woodbridge (CA)

(*) Notice: Subject to any disclaimer, the term of this patent is extended or adjusted under 35 U.S.C. 154(b) by 0 days.

(21) Appl. No.: 14/638,247

(22) Filed: Mar. 4, 2015

(65) Prior Publication Data

US 2015/0176234 A1 Jun. 25, 2015

Related U.S. Application Data

(63) Continuation of application No. 13/765,225, filed on Feb. 12, 2013, now Pat. No. 8,985,619.

(30) Foreign Application Priority Data

Feb. 13, 2012 (CA) ..................... 2767618

(51) Int. Cl.
| | | |
|---|---|---|
| *E01H 5/02* | (2006.01) | |
| *B62B 1/20* | (2006.01) | |
| *B62B 1/00* | (2006.01) | |
| *E01H 5/06* | (2006.01) | |
| *B62B 5/08* | (2006.01) | |
| *B62B 1/18* | (2006.01) | |
| *B62B 3/02* | (2006.01) | |

(52) U.S. Cl.
CPC *E01H 5/02* (2013.01); *B62B 1/002* (2013.01); *B62B 1/186* (2013.01); *B62B 1/20* (2013.01); *B62B 1/204* (2013.01); *B62B 3/02* (2013.01); *B62B 5/085* (2013.01); *E01H 5/061* (2013.01); *B62B 2206/006* (2013.01); *B62B 2301/10* (2013.01)

(58) Field of Classification Search
CPC ............. B60R 19/00; E01H 5/00; E01H 5/02; E01H 5/06; E01H 5/061; E01H 5/062; E01H 5/063; E01H 5/065; E01H 5/066; B62B 1/002; B62B 1/186; B62B 1/20; B62B 1/204; B62B 3/02; B62B 5/061

USPC ............ 280/762, 30, 35, 652, 653, 654, 659, 280/47.16, 47.3, 47.31, 47.32; 37/231, 232, 37/233, 241, 266, 270, 903

See application file for complete search history.

(56) References Cited

U.S. PATENT DOCUMENTS

| | | | | |
|---|---|---|---|---|
| 4,227,709 | A * | 10/1980 | Gradwohl | B62B 1/002 280/47.11 |
| 4,571,861 | A * | 2/1986 | Klever | E01H 5/066 111/34 |
| 5,031,926 | A * | 7/1991 | Wannamaker | B62B 1/20 280/47.2 |
| 5,489,109 | A * | 2/1996 | Murphy | B62D 63/064 280/415.1 |
| 6,419,244 | B2 * | 7/2002 | Meabon | B62B 1/002 280/47.17 |
| 6,474,007 | B1 * | 11/2002 | Sueshige | B62B 1/20 180/19.3 |
| 8,166,677 | B1 * | 5/2012 | Woyak | E01H 5/02 294/54.5 |
| 8,231,132 | B2 * | 7/2012 | DiLorenzo, Sr. | B62B 3/001 280/47.31 |
| 8,505,973 | B2 * | 8/2013 | Hill | B62D 49/04 172/272 |
| 2001/0045029 | A1 * | 11/2001 | Fulton | E01H 5/02 37/266 |
| 2005/0246925 | A1 * | 11/2005 | Raddon | E01H 5/06 37/266 |
| 2007/0068050 | A1 * | 3/2007 | Flanagan | E01H 5/02 37/285 |

* cited by examiner

*Primary Examiner* — John Walters

(57) ABSTRACT

A wheelbarrow conversion kit is used to convert a wheelbarrow structure to accommodate a push blade. The handles of the wheelbarrow provide, in combination with the wheels of the wheelbarrow, considerable mechanical advantage for pushing and lifting snow. The push blade assembly is removably attached to the frame of the wheelbarrow at a front edge thereof and can be removed if not required.

16 Claims, 15 Drawing Sheets

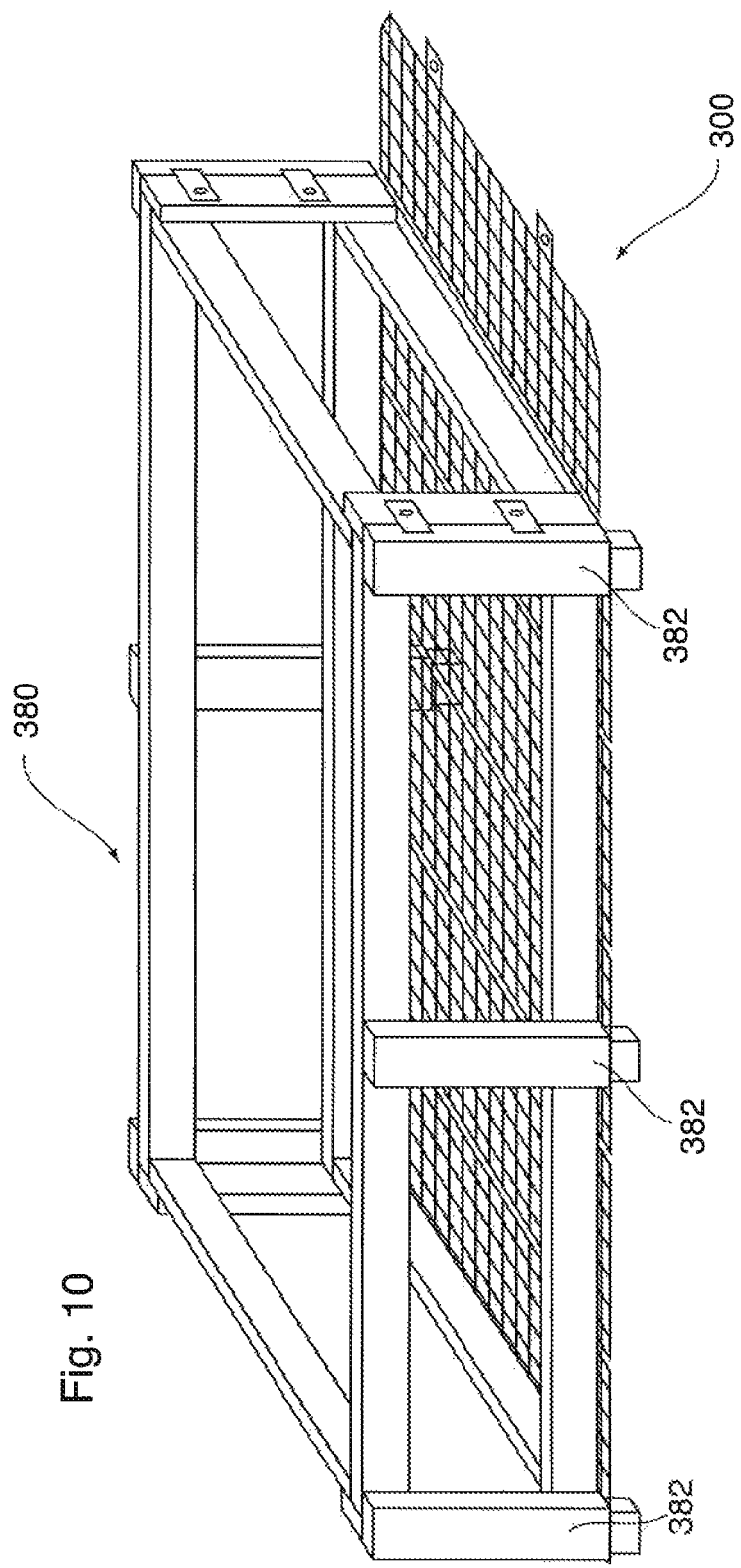

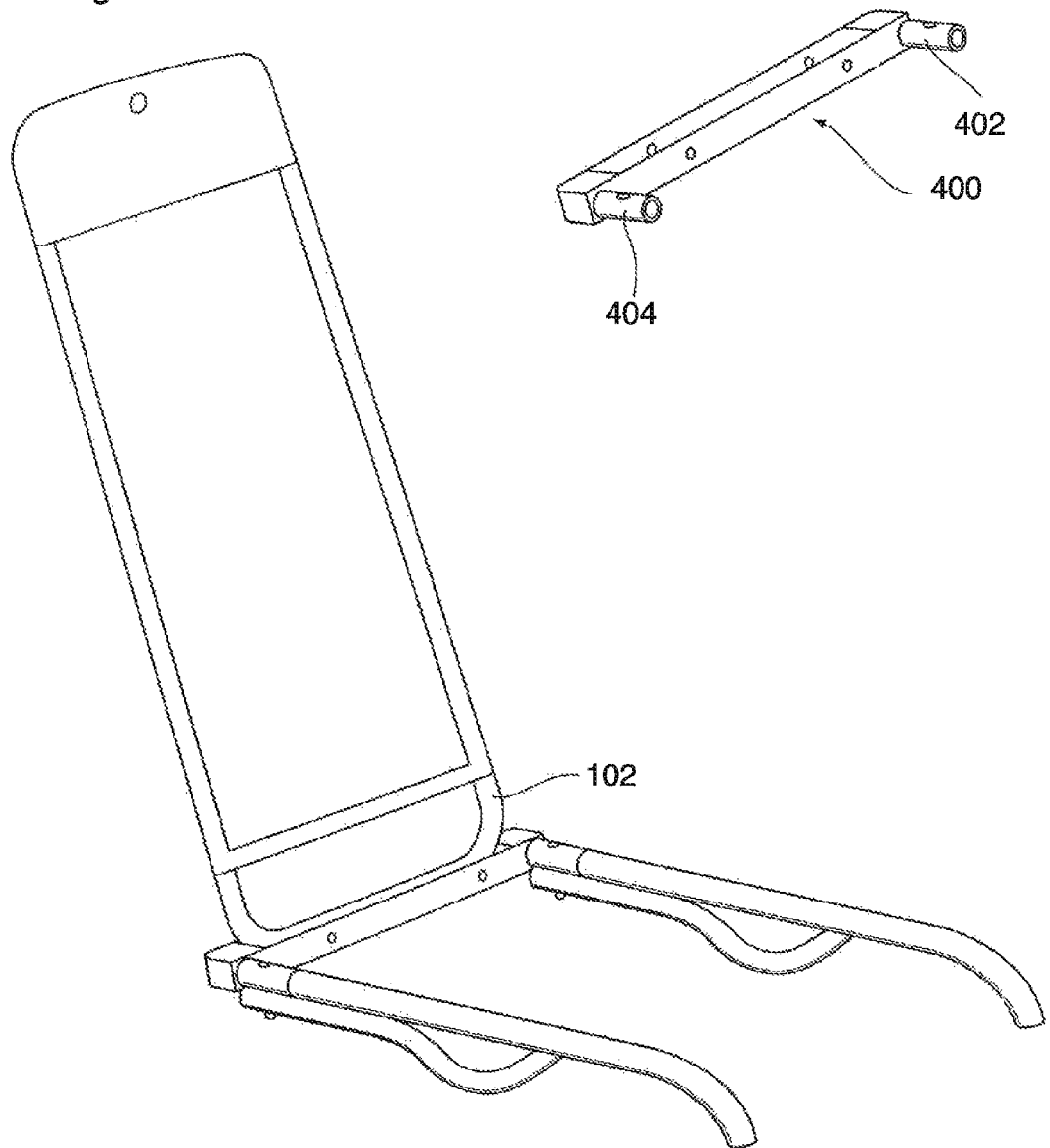

Fig. 17
Fig. 18
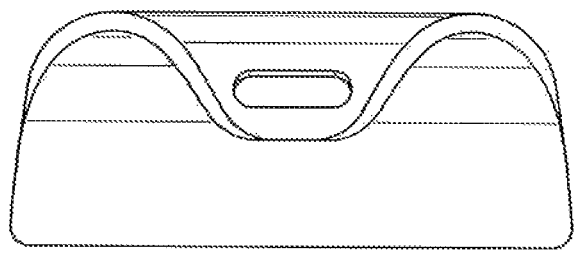
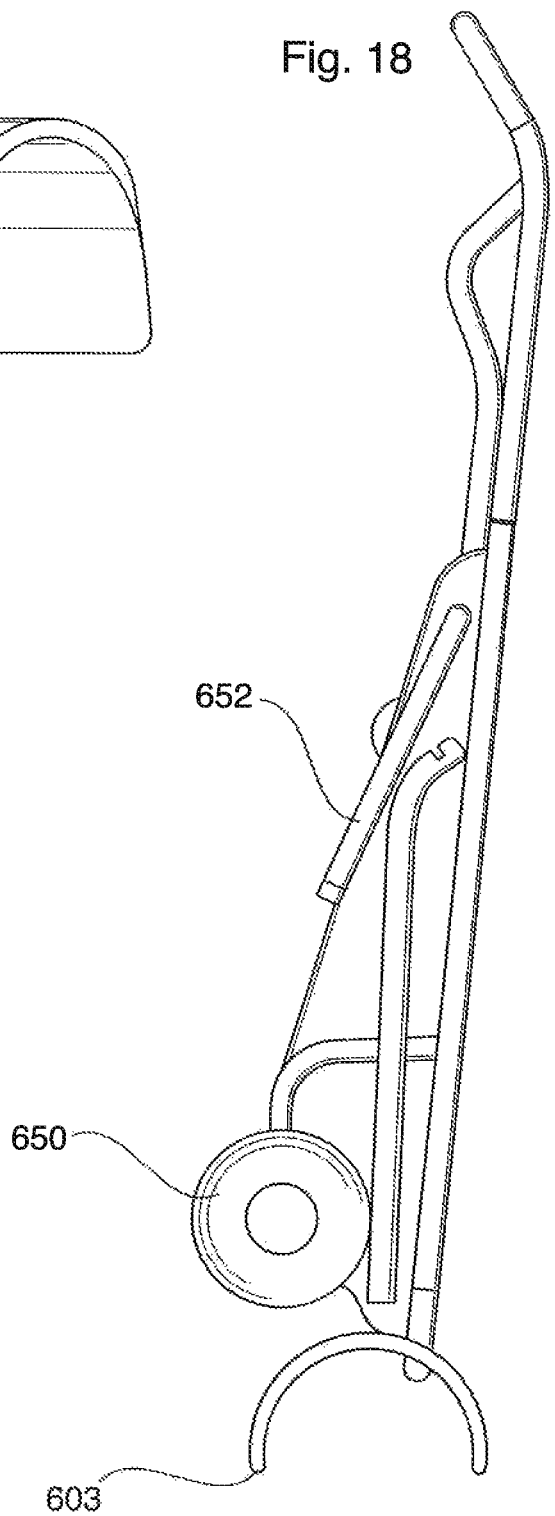

WHEELBARROW WAGON CONVERSION

This is a continuation of pending U.S. application Ser. No. 13/765,225 filed on Feb. 12, 2013 entitled "Wheelbarrow Wagon Conversion" and which is incorporated herein by reference.

FIELD OF THE INVENTION

The present application relates to a multi-function wheelbarrow and in particular to a snow plow attachment that can be used with the multi-functional wheelbarrow to extend the functionality of the wheelbarrow.

BACKGROUND OF THE INVENTION

A multi-function hand truck is disclosed in my earlier U.S. Pat. Nos. 6,945,545 and 7,168,712 (incorporated herein by reference). The wheelbarrow structure includes moveable front wheels that allow the wheelbarrow to function in different manners including a vertical storage capability.

My multi-function wheelbarrow can also function as a hand truck and includes a pivoting arm structure for lifting of large loads or containers.

I have found that my convertible wheeled device has many applications around the home, but has proven particularly popular as a small wheelbarrow for gardening applications. To further extend the functionality of my wheelbarrow, I have invented a number of cooperating components that allow my multi-function wheelbarrow to convert to a wagon structure that preferably includes a support seat for the user. A number of further cooperating components are shown including a top support arrangement for the wheelbarrow when in a wagon configuration allowing material to be stored on the top thereof and also a vertically extending rail-type attachment for securement to a top surface of the wagon configuration. In a further embodiment, additional carrying capacity in a wheelbarrow application is achieved by extending the capacity of the wheelbarrow bucket.

In addition I have designed a snow plow attachment that advantageously can be used in the winter when the wheelbarrow otherwise would not be used.

SUMMARY OF THE INVENTION

A push blade assembly according to the present invention comprises a push blade made of a molded plastic material and having a curved front face with a lower ground engaging edge. The push blade includes a mounting structure extending generally horizontally and rearwardly from a back face of the push blade with the mounting structure being generally parallel to the lower ground engaging edge and extending either side of a mid point in a length of the push blade. The mounting structure includes upper and lower flanges defining a rearwardly opening 'U' shaped channel with a mechanical fastener passing through the upper and lower flanges adjacent a free edge thereof for drawing the flanges together during securement of the push blade assembly to a tubular frame component of a separate wheeled structure.

According to an aspect of the invention, the mechanical fastener is bolt and nut assembly.

In a further aspect of the invention, the push blade includes along a top edge thereof at least one forwardly extending flange. The at least one forwardly extending flange cooperates with the lower ground engaging edge to support the push blade with the 'U' shaped channel opening upwardly when the lower ground engaging edge and the at least one forwardly extending flange collectively support the push blade on a surface.

According to an aspect of the invention, the at least one forwardly extending flange is a single forwardly extending flange centrally located in a length of the push blade.

In a preferred aspect of the invention the single forwardly extending flange includes a finger port configured to allow engagement of the snow plow assembly.

In an aspect of the invention, the mechanical fastener includes a bolt member having a handgrip head for tightening of the bolt with a threaded nut portion. Preferably, the threaded nut portion is part of or retained by the lower flange allowing tightening of the mechanical fastener by rotation of the handgrip head.

In an aspect of the invention, the 'U' shaped channel is an integral part of the push blade. Preferably, the 'U' shaped channel forms a horizontal reinforcing rib that is centrally positioned and extends over at least 75% of the length of the rear face.

In a further aspect of the invention, the push blade assembly is used in combination with a multi-function wheelbarrow.

In a different aspect of the invention a snow plow blade assembly can be secured to the front of a multi-function wheelbarrow. Preferably the snow plow blade is an injection molded plastic component that preferably includes an integral mounting channel allowing releasable securement to a front tubular portion of the wheelbarrow frame. Preferably a bolt type fastener passes through a portion of the dolly truck load plate and draws two mounting flanges on the plow blade into locked engagement with a tubular component of the wheelbarrow frame.

BRIEF DESCRIPTION OF THE DRAWINGS

Preferred embodiments of the invention are shown in FIGS. 4 to 18 of the drawings, wherein:

FIG. 10 is a perspective view of the support arrangement of FIG. 9 in combination with a rail arrangement for attachment to the wheelbarrow;

FIG. 11 is a partial perspective view of a further adaption where the handles of the wheelbarrow can be secured at one end of the wagon structure;

FIG. 12 shows additional details of an adaptive bracket used in the structure of FIG. 11;

FIG. 17 is a front view of the push blade; and

FIG. 18 is a sideview of the combination in a vertical storage position.

DETAILED DESCRIPTION OF THE PREFERRED EMBODIMENTS

Figure 1:
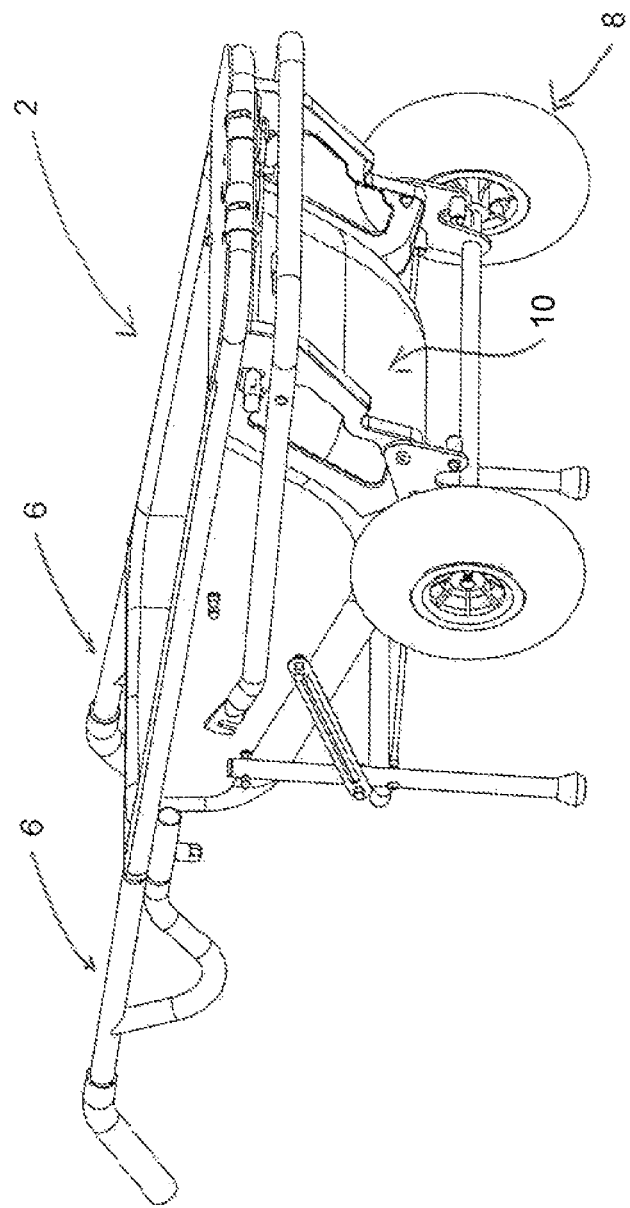
FIG. 1 is a perspective view of my earlier convertible wheelbarrow structure in an operative configuration.
Figure 2:
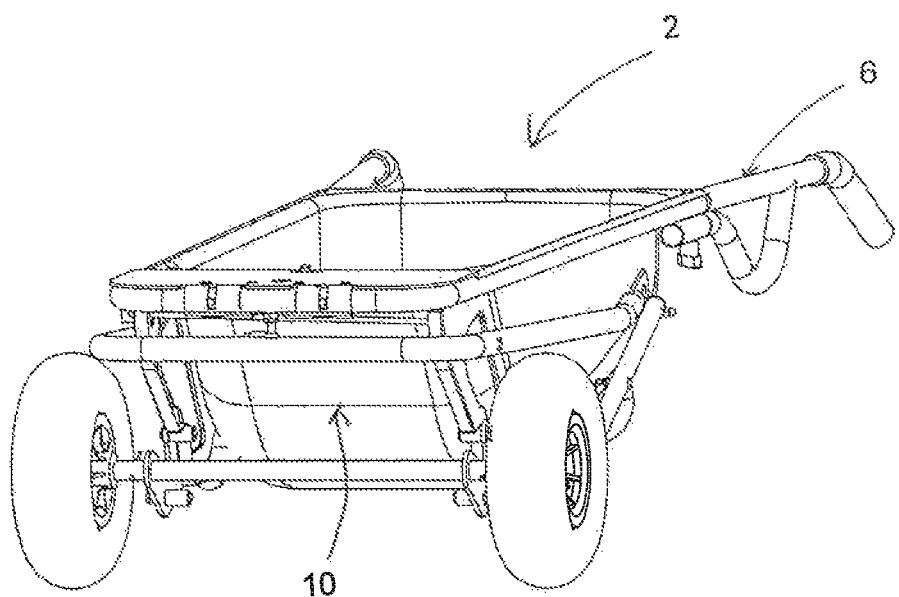
FIG. 2 is a perspective view of my earlier wheelbarrow structure with the wheels moved to a storage position.
Figure 3:
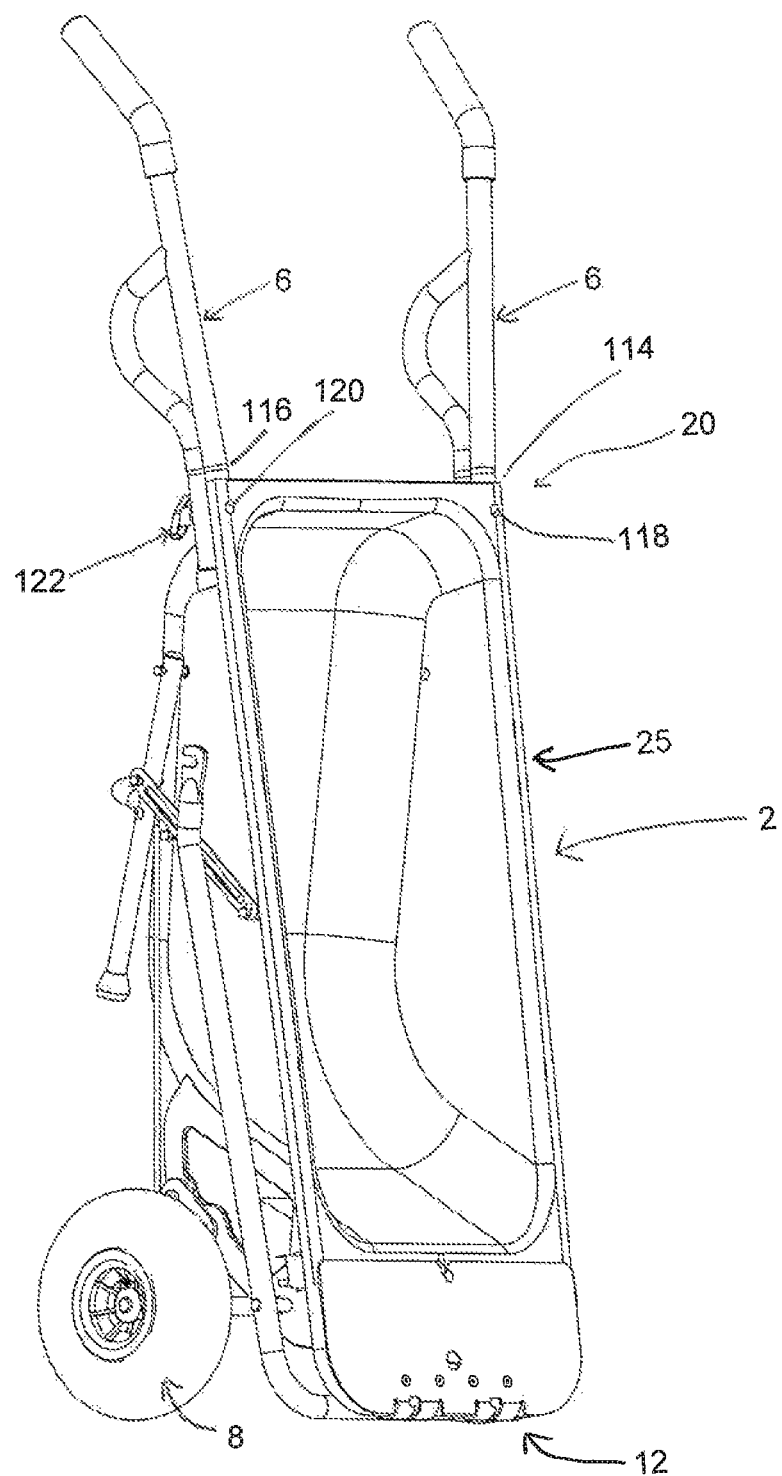
FIG. 3 is a perspective view of my earlier wheelbarrow structure in a storage position.

My multi-function wheelbarrow is shown in FIGS. 1, 2 and 3. The wheelbarrow 2 is shown in FIG. 1 in the operational position and the wheels 8 have been moved and are generally located below the front of the wheelbarrow container 10. It can be seen that the wheelbarrow includes two removable handles 6 provided at the opposite end of the wheelbarrow.

In FIG. 2, the wheels have been moved forwardly and inwardly and are located in front of and generally within the width of the container 10. This allows the wheelbarrow structure to in one embodiment function as a hand truck and additionally to move to the wheels to the forward position shown in FIG. 3. Basically, the wheelbarrow can store in a vertical orientation supported by the wheels 8 and a front portion 12 as shown in FIG. 3.

It has been found that my wheelbarrow structure is particularly popular for home gardening applications perhaps due to its multi-function capability, unique wheelbarrow configuration and/or the ability to store in a space efficient manner.

Figure 4:
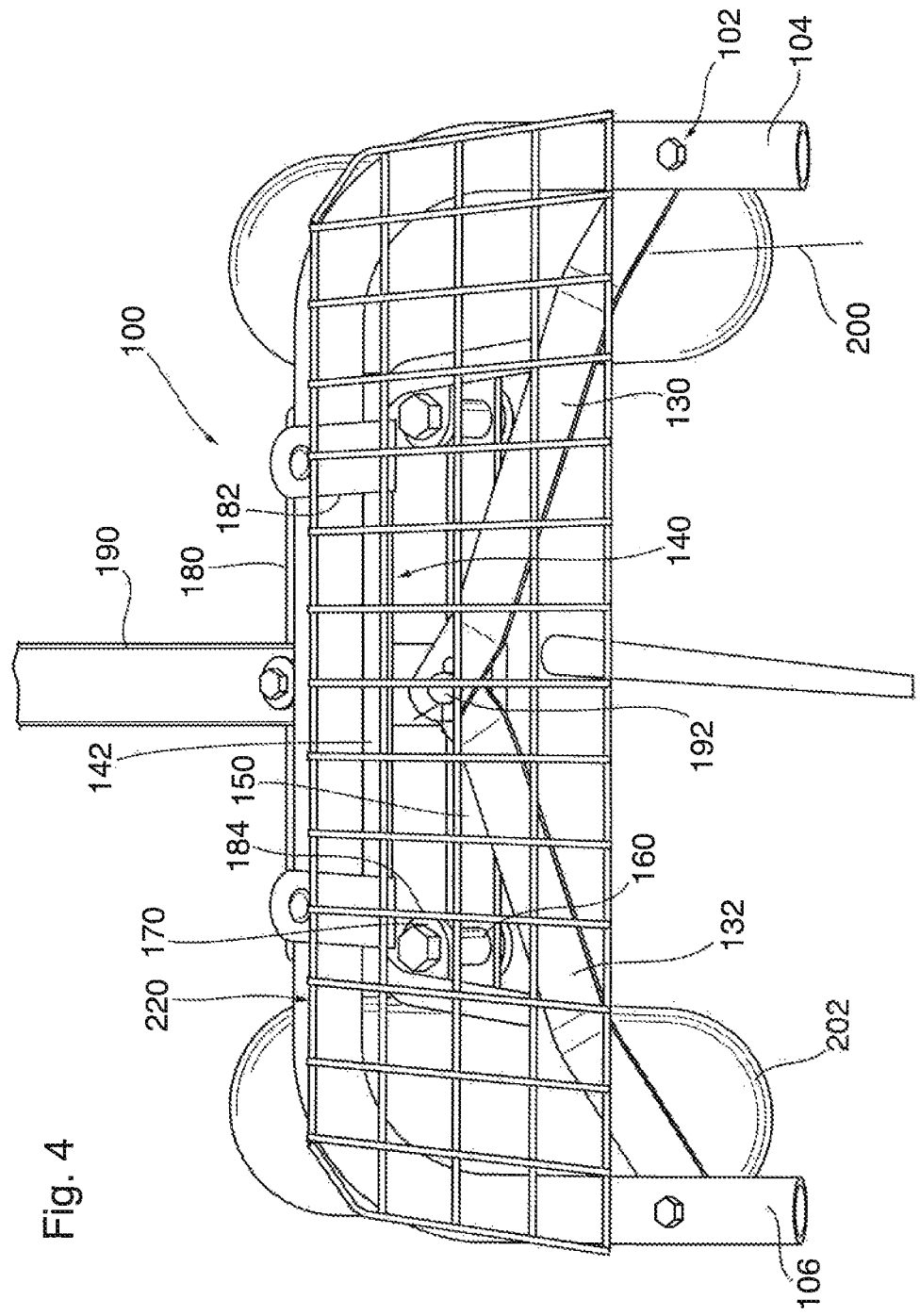
FIG. 4 is a perspective view of a wagon wheel adaptor that can be attached to my wheelbarrow structure.

FIG. 4 shows my wagon conversion structure that allows the wheelbarrow to additionally function as a pull wagon. A wagon adaptor 100 is shown in FIG. 4 and includes a U-shaped frame 102 having two slightly angled end tubes 104 and 106 that are sized for insertion in the end rail 20 where the handles 6 are normally secured. In order to secure the wagon adaptor 100, the handles 6 are removed and the end tubes 104 and 106 of the U-shaped bracket 102 are inserted in the upper ports 114 and 116 that normally receive the handles 6. The rails 20 of my structure slightly diverge from the end 12 towards to the handles 6 and for this reason the ends 104 and 106 are slightly tapered to allow the ends 104 and 106 to be first inserted into the ports 114 and 116 and subsequently pushed to a secure position.

As shown in FIG. 3, the handles 6 are each secured to the body 25 of the wheelbarrow by bolts 118 and 120 and a handgrip nut shown as 122. To secure my wagon adaptor 100, the bolts 118 and 120 are removed, the handles 6 are removed from the wheelbarrow body 25. The ends 104 and 106 are inserted into the upper ports 114 and 116 that previously received the handles. The bolts 118 and 120 and handgrip nuts 122 are then reinserted and tightened to secure the ends 104 and 106 to the wheelbarrow body 25.

The bracket members 130 and 132 are located beneath the securing portion of the ports 114 and 116 and are also secured by the bolts 118 and 120. These basically provide a stabilizer arrangement for the downwardly extending wheel structure shown as 140. This downwardly extending wheel structure 140 includes a U-shaped member 142 secured to member 102 by bolts. Member 142 is connected by a flat bar member 150 that extends between the ends of the U-shaped bracket 142. The bar member 150 supports pivoting bushings 160 of each wheel between the member 150 and an upper bracket 170.

Basically, the U-shaped member 142 is secured to member 150 by welding (or otherwise securing) the bracket 170 to the arms of the U-shaped bracket 142. A steering link 180 connects forwardly extending levers 182 and 184 of each wheel and allow pivoting and steering of the wagon. A steering handle shown as 190 pivots about 192 and thus, movement of the handle 190 causes a shifting of the steering linkage 180.

It can be appreciated that other arrangements for steering of the wheels 200 and 202 can be provided. The important aspect is the securement of the wagon adaptor 100 to one end of the frame of my wheelbarrow remote the original wheelbarrow wheels 8. Preferably, this securement is achieved using the U-shaped bracket 102 having the end portions 104 and 106 thereof inserted in the securing ports that normally receive the removable handles 6. Tightening of the bolts 118 and 120 firmly secure the U-shaped bracket 102 to the end of the wheelbarrow remote the original wheels 8 and allow conversion to a steerable wagon.

With the adaptor 100 secured at the end of my multi-function wheelbarrow it has now been converted to a wagon-type structure having a pivoting handle for pulling and steering of the wagon. The attachment of the wagon adaptor 100 advantageously uses the existing structure of the wheelbarrow to allow the wagon adaptor 100 to be a simple structure that is easily secured.

Figure 5:
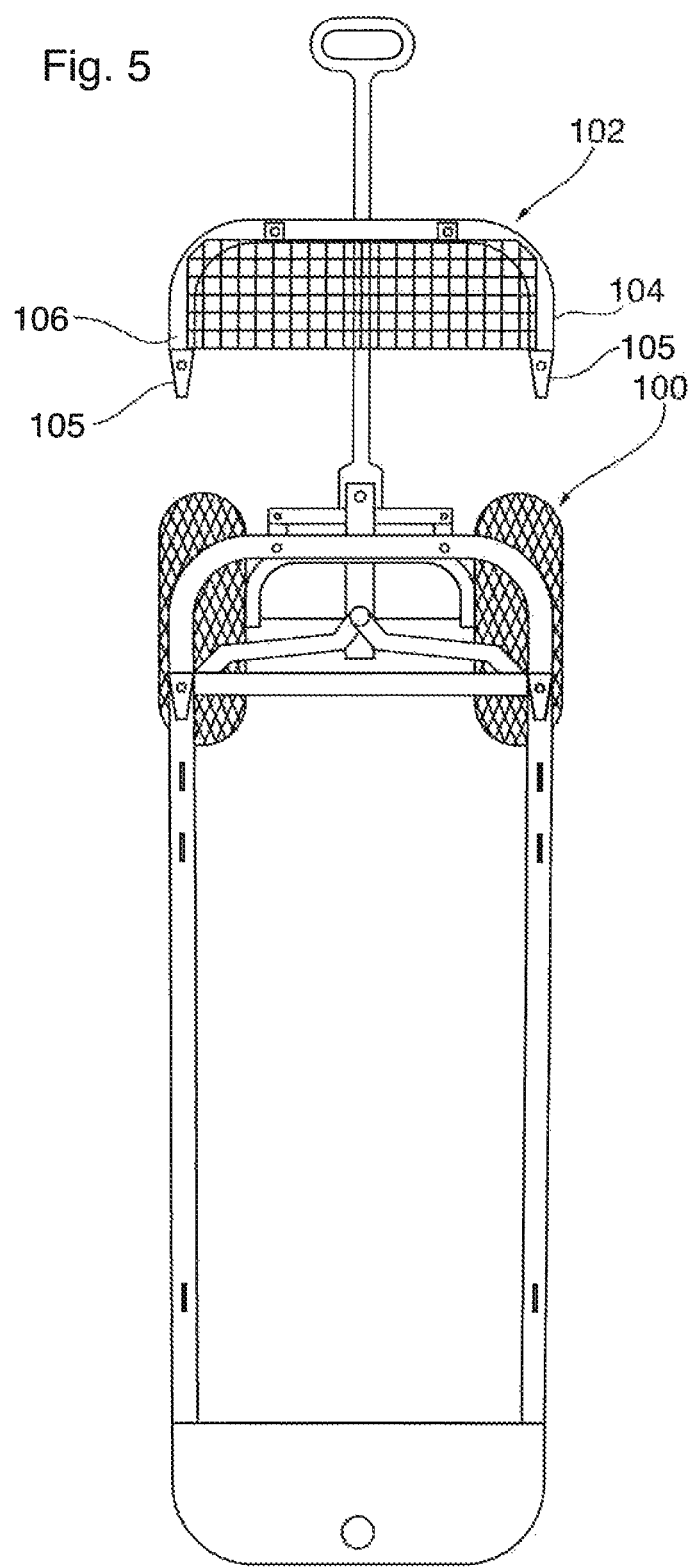
FIG. 5 is a top view illustrating attachment of my steerable wheel arrangement to one end of the frame of the multi-function wheelbarrow.

As previously mentioned, the ends 104 and 106 slightly include a taper for ease of attachment. This allows the ends 104 and 106 to initially be placed in the ports 114 and 116 as there is some play due to the taper. Once the ends have been inserted, it is then possible to push the adaptor 100 to a secure position where the bolts 118 and 120 and the handgrip nuts can be reattached. As can be appreciated, this movement to the securing position as shown in FIG. 5 provides a snug removable fit of the ends 104 and 106 in the ports 114 and 116. Furthermore, the wagon adaptor 100 is held in place and effectively tightened by the bolts 114 and 116.

As shown in the top view of FIG. 5, the ends 104 and 106 can also include a tapered insert 105 and 107 that are permanently secured to the ends of the U-shaped bracket 102. The purpose of the tapered plugs 105 and 107 is to simplify securement while also allowing a snug fit of the wagon adaptor 100 to the rail members of the body of the wheelbarrow.

As shown in FIGS. 4 and 5, the U-shaped bracket 102 preferably includes a cover screen 220. The cover screen 220 effectively closes the gap between the arms of the U-shaped bracket and acts as a barrier to the underlying space used by the steering linkage. This parallelogram-type steering linkage is a potential safety hazard and the screen 220 acts as a safety guard against inadvertent insertion of hands or fingers into this space.

Figure 6:
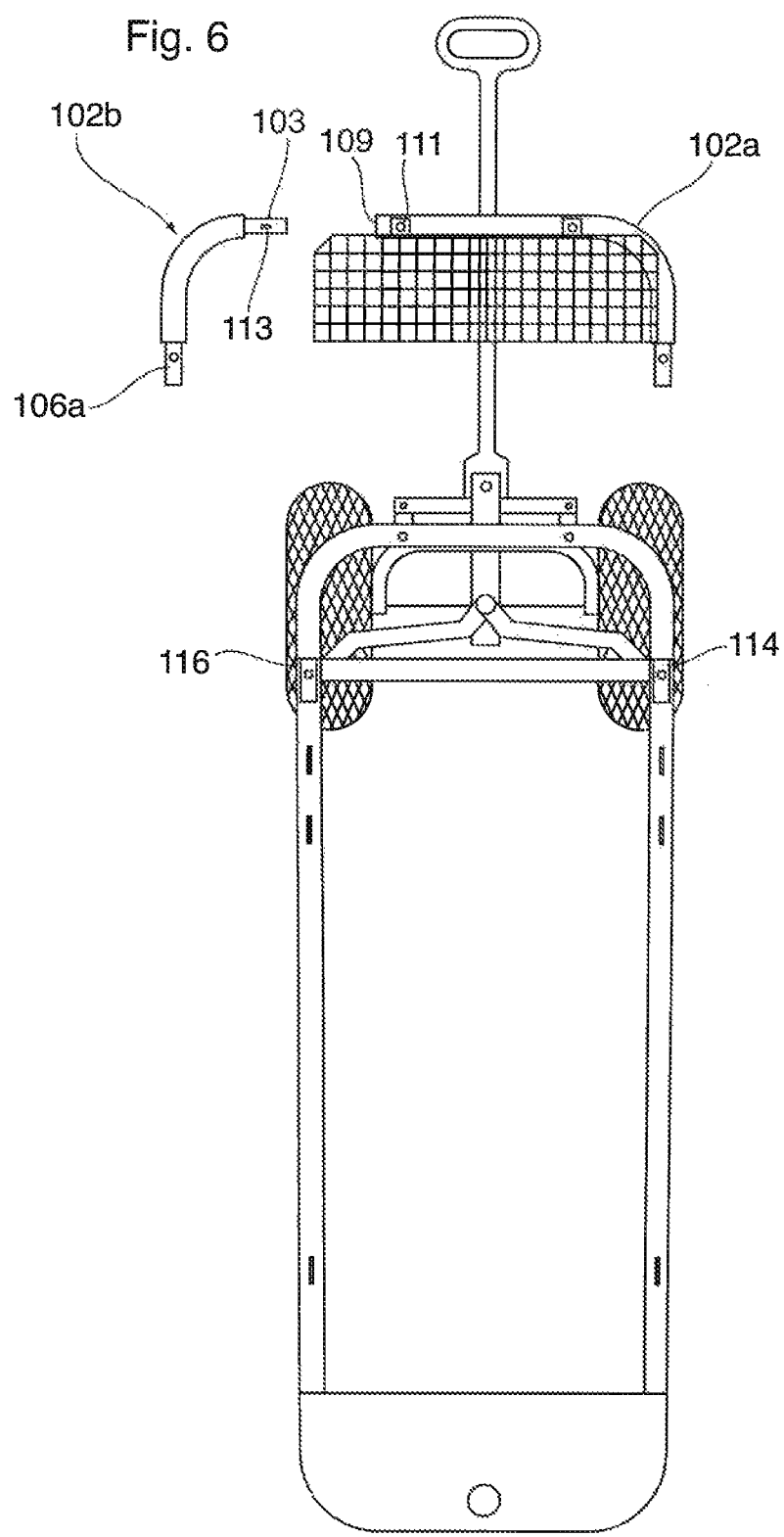
FIG. 6 is a top view similar to FIG. 5 showing an alternate adaptive frame for attaching wagon wheels to one end of my multi-function wheelbarrow.

In the alternate embodiment of FIG. 6, the U-shaped bracket 102 has been broken into a first component 102A and a second component 102B. These components are secured to each other by a plug portion 103 being inserted in the end 109 and mechanically fastening the bolt 111 that passes through the elongate port 113. The elongate port 113 allows for some play or movement between the two brackets before the bolt 111 is tightened. This allows initial insertion of ends 104A and 106A in the ports 114 and 116. The components 102A and 102B can then be moved to a secured position where parts 102A and 102B basically abutt. 102A and 102B are then fixed by tightened of the bolt 111.

Figure 7:
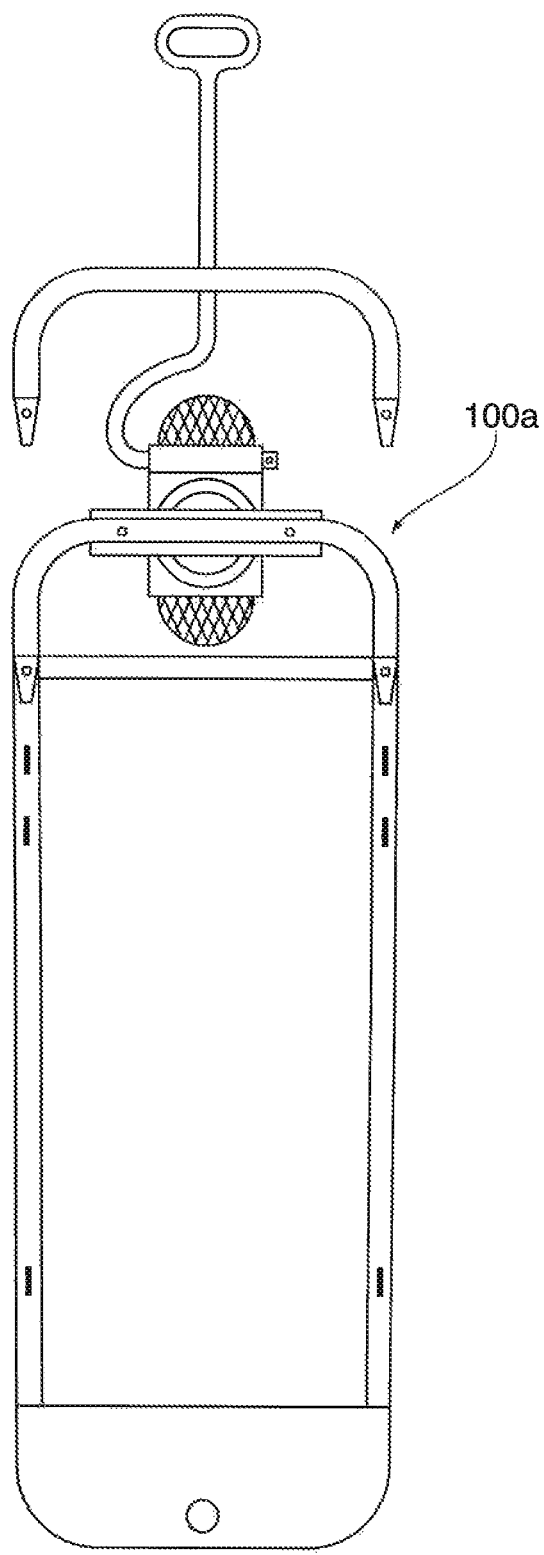
FIG. 7 is a view similar to FIG. 5 illustrating a single wheel conversion arrangement.
Figure 8:
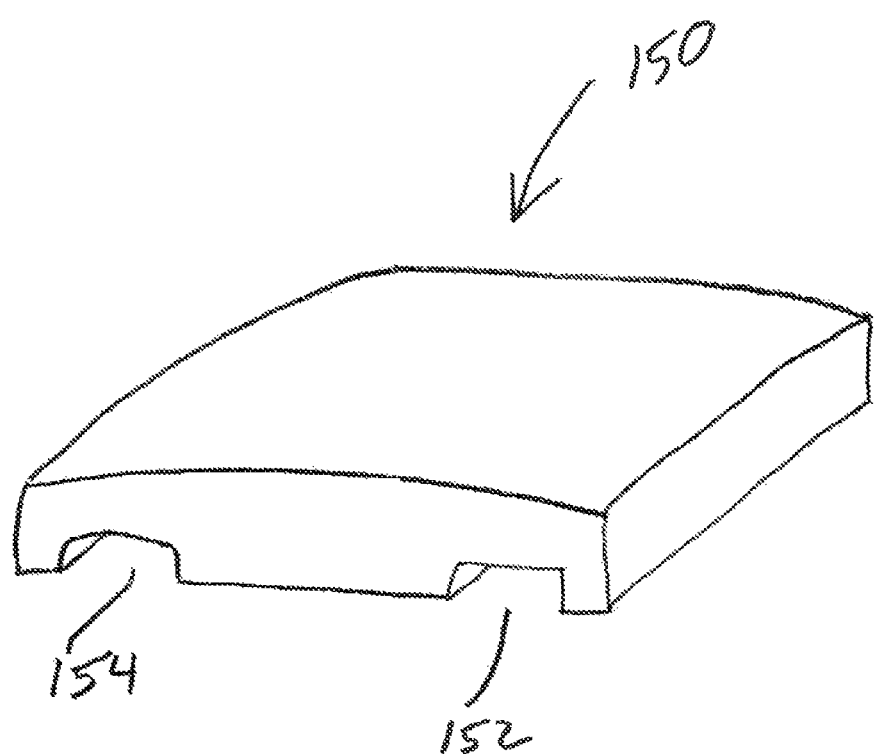
FIG. 8 is a perspective view of a seat that can be applied to opposite sides of the wheelbarrow to provide a seat for the user.

In FIG. 7, a different wagon adaptor 100A is shown that again uses a U-shaped bracket however in this case, a single wheel is secured beneath the U-shaped bracket. This structure is somewhat simpler than the embodiment of FIG. 6 or FIG.

5 however the single wheel is not as stable as the dual wheel embodiment. The double wheel arrangement of FIGS. 4 and 5 is preferred.

In FIG. 7, a seat 150 is shown that is of a size to straddle the wheelbarrow cavity such that the side rails of the wheelbarrow pass through the elongate slots 152 and 154. With this arrangement, the seat 150 may be placed over the wheelbarrow cavity and the top surface of the seat provides the support for a user. Thus the user can convert the wheelbarrow structure to the wagon arrangement and this essentially supports the upper edge of the wheelbarrow in a horizontal manner. The rails of the wheelbarrow that are extending from end to end can be located within the slots 152 and 154. It has been found that when a person is gardening it may be desirable to use the seat from time to time. Various arrangements can be used to secure the seat (including a simple pin arrangement) if desired.

Figure 9:
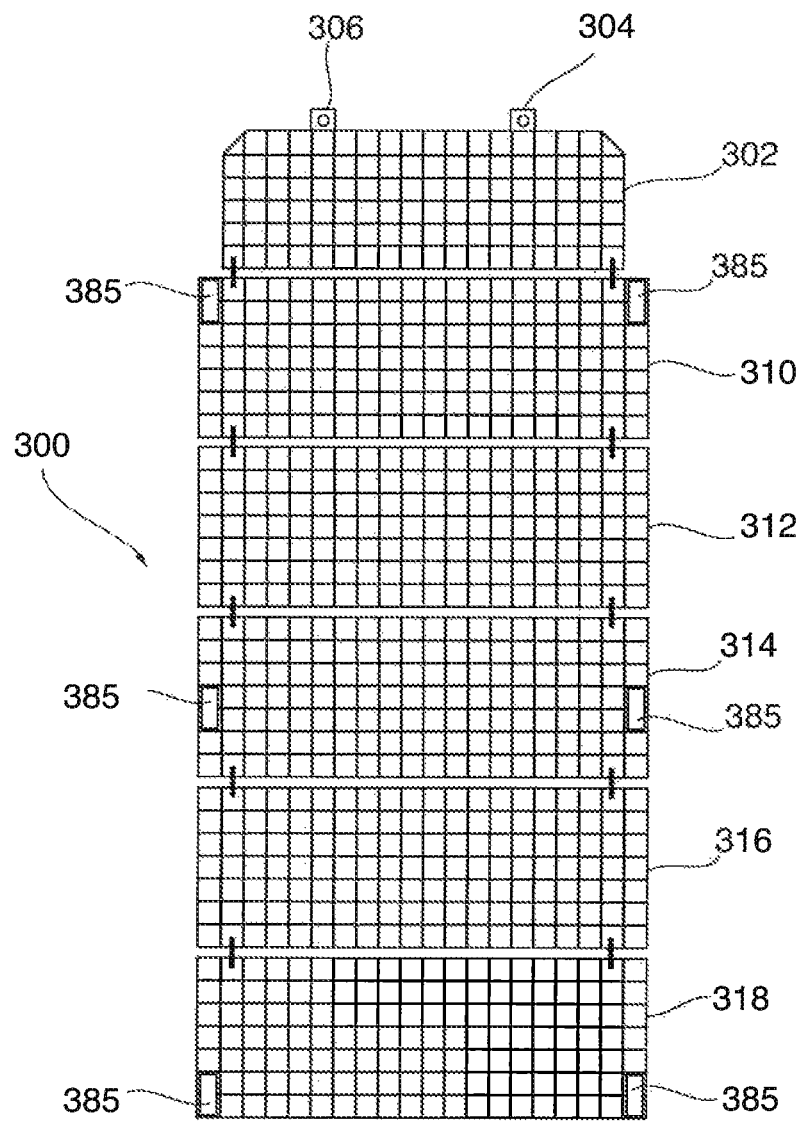
FIG. 9 is a partial perspective view of a foldable grid support that can be applied over the top of the wheelbarrow.

In FIG. 9, a foldable grid support 300 is shown. This includes a grid portion 302 at one end thereof having tab-type members 304 and 306. These members can be fixedly secured to the U-shaped bracket 102 in a manner as shown in FIG. 4. Preferably the grid support 300 includes individual grid sections 302, 310, 312, 314, 316 and 318. These sections are preferably hingedly connected to one another to allow folding of the support on the sections to provide a compact storage arrangement. As can be appreciated, it is desirable that the support be convertible to a storage arrangement for space efficiency.

The support 300 is designed to cover the open cavity of the wheelbarrow and is secured to the wheelbarrow upper portion in any of a number of different ways. For example, small tabs may be provided around the edge of the wheelbarrow cavity to allow securement. An alternate embodiment is shown in FIG. 10 where the support 300 includes an upper rail portion 380. The support 300 includes slot areas 385 for receiving the vertical rail members 382 that are received in ports (not shown) provided the upper edge of the wheelbarrow. With this arrangement, the wagon has a rail arrangement similar to many known child's wagons. The purpose of the wagon is for gardening-type applications as opposed to a structure for use by a child. However the rail arrangement is useful in supporting loads placed on the support member 300.

FIGS. 11 and 12 show a further embodiment of the invention where the bracket member 400 co-operates with the U-shaped member 102 and provides upwardly extending securing plugs 402 and 404 for receiving the handles 6. The handles 6 effectively slide over the plugs 402 and 404 and can be secured thereto by bolts. With this arrangement, the wagon structure can additionally be pushed from one end as opposed to being pulled.

Figure 13:
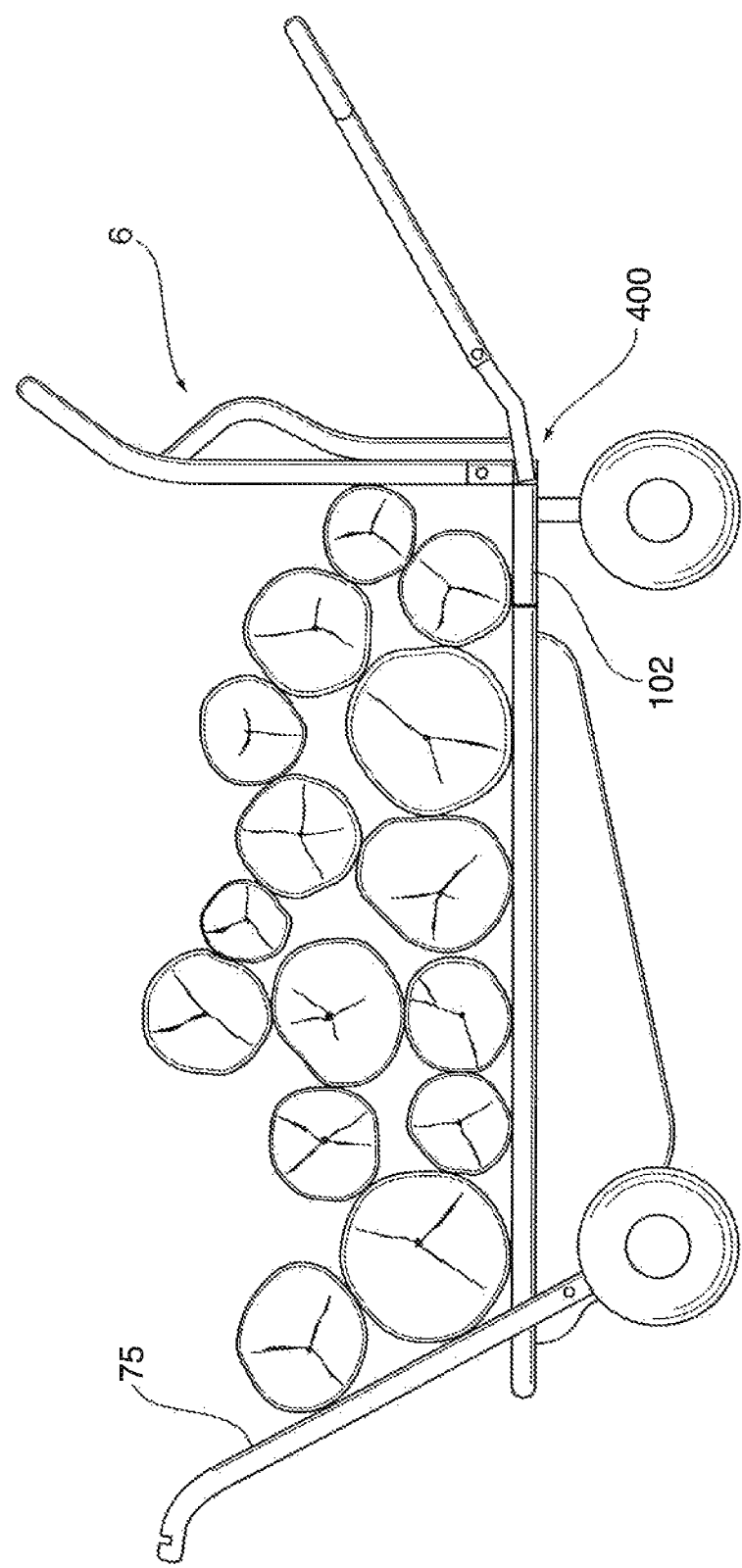
FIG. 13 is a side view of the multi-function wheelbarrow converted to a wagon and having upright supports.

In FIG. 13, it can be seen that the wagon structure now has the handles 6 secured in a vertical manner by the bracket 400 to the U-shaped member 102. In addition, the lifting arms 75 have been moved to their normal operating position and form a further upwardly extending support member. With this structure as shown in FIG. 13, the wagon includes upwardly extending members to allow stacking of material on the top support of the wagon or stacked in the wagon cavity.

Figure 14:
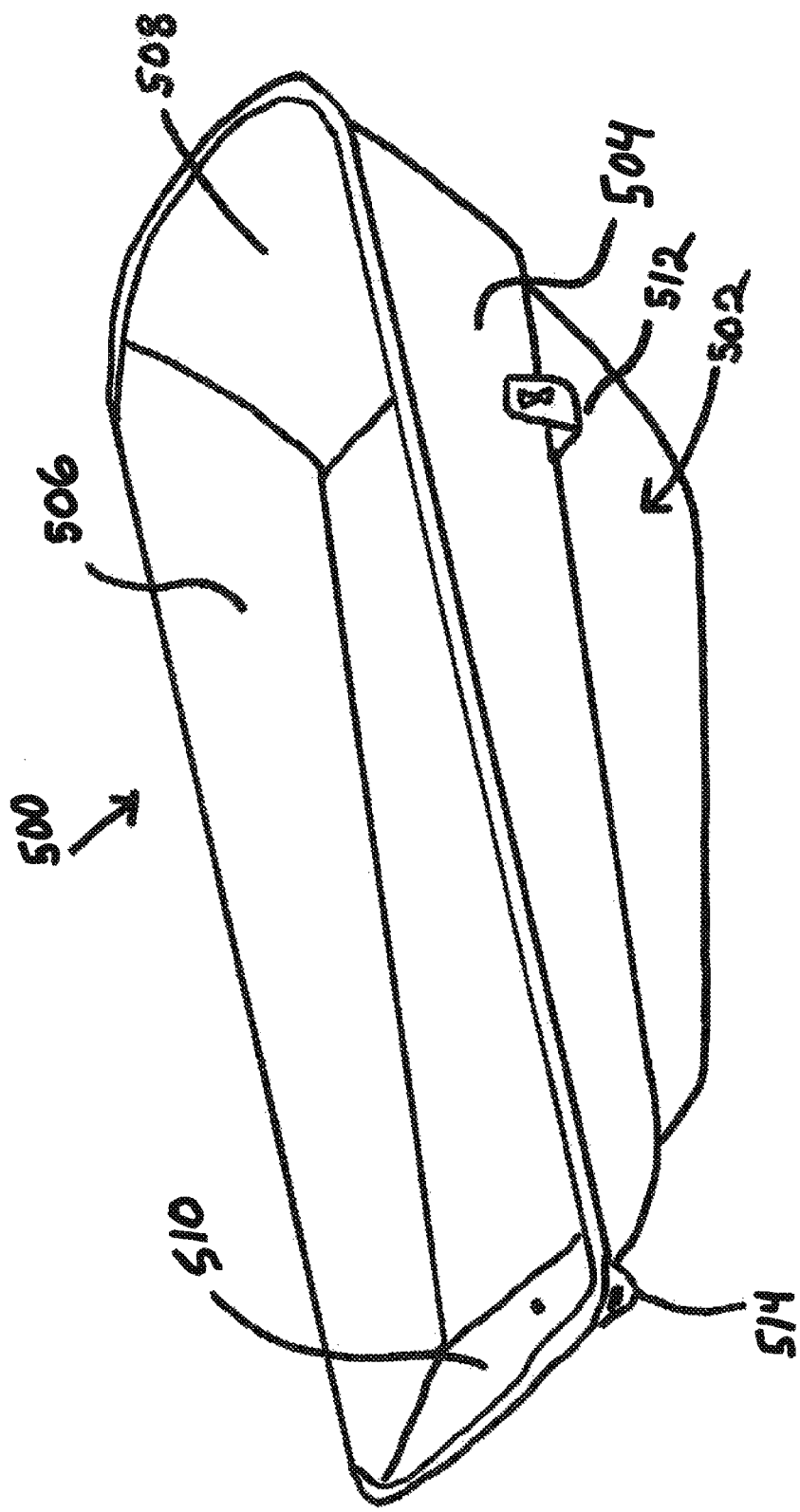
FIG. 14 illustrates a molded wheelbarrow container of additional capacity that can be attached to my multi-function wheelbarrow.

In FIG. 14, a further embodiment of my invention is shown wherein a further molded wheelbarrow cavity 500 is shown. This member includes a lower portion 502 that is shaped for a snug fit within the existing cavity of the wheelbarrow. Member 500 includes outwardly extending side members 504 and 506 and outwardly extending end portions 508 and 510. A series of clips or brackets 512 and 514 can be provided around the perimeter of member 500 for engagement with the upper portion of the wheelbarrow. In this way, the higher capacity insert 500 can be inserted and held within the wheelbarrow. This allows the capacity of the wheelbarrow to be extended in a simply manner and to also allow for other uses that may require additional capacity. Furthermore, there may be applications where it is desirable to protect the normal cavity of the wheelbarrow and this can be done by inserting the larger cavity member 500.

Member 500 need not include a bottom portion to provide the additional capacity. In an open structure of member 500, the bottom portion of the existing wheelbarrow cavity is used and member 500 merely extends the sides and end walls.

As shown in the drawings, my convertible wheelbarrow structure has been further enhanced by the addition of a wagon adaptor at one end of the wheelbarrow and a series of additional components that allow the converted wagon structure and/or wheelbarrow structure to function in different manners.

A further embodiment of my invention is shown in FIGS. 15 through 18. In this embodiment a snow plow blade is releasably attached to the front of the wheelbarrow to allow conversion for simplifying snow removal in the winter.

Figure 15:
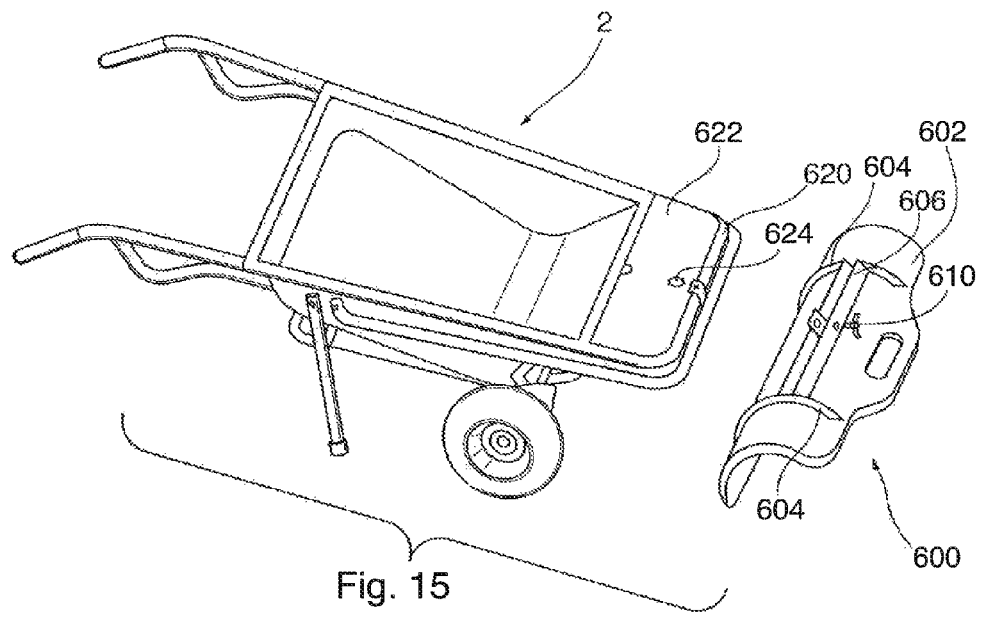
FIG. 15 is a perspective view of the wheelbarrow and push blade assembly about to be secured to the wheelbarrow.

FIG. 15 shows the push blade assembly 600 for securement to the front edge of my multifunction wheelbarrow shown as 2 that is particularly effective for snow shovelling. The front of my wheelbarrow includes a circular in cross section tube 620 that forms part of the frame of the wheelbarrow. The push blade 602 is preferably an injection molded plastic component as the traditional curved blade surface of a traditional push snow shovel. Injection molded push blade 602 includes reinforcing ribs 604 and also includes the mounting U-shaped channel 606 that extends horizontally across the back of the blade. This U-shaped channel is open rearwardly and allows sliding onto the circular tube 620 provided at the front of the wheelbarrow. This dolly plate 622 includes a mounting port 624 which can also be used in association with the trailer ball hitch attachment. In this case the mounting port is open and cooperates with the center mounting bolt 610 that extends through and is perpendicular to the U-shaped mounting channel 606 and will pass through the mounting port 624. A nut can be injection molded into the plastic U-shaped channel 606 or a separate metal nut can be provided to cooperate and lock with the center mounting bolt 610.

Figure 16:
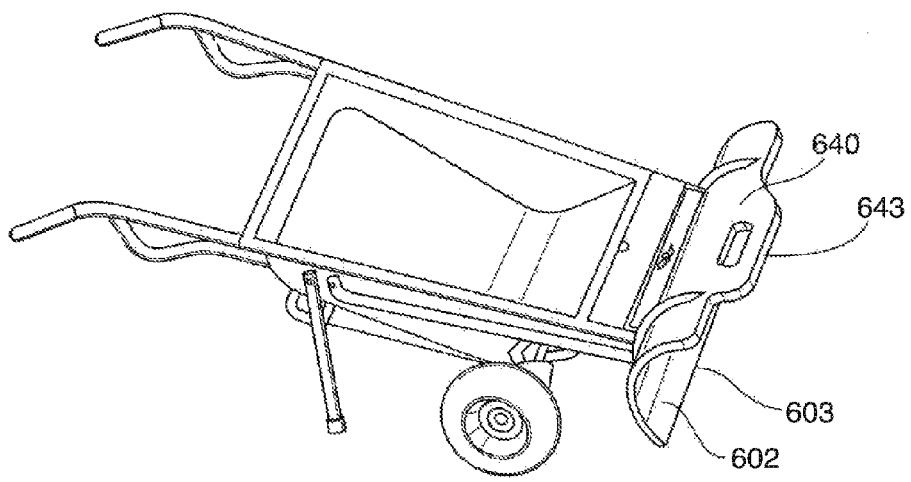
FIG. 16 is an assembled view of the wheelbarrow and push blade assembly.

FIG. 16 shows the snow shovel push blade assembly mounted on and secured to the front portion of the multifunction wheelbarrow 2. The U-shaped mounting channel 606 straddles the circular tube 620 and the snow shovel push blade assembly is secured on the front end of the wheelbarrow by the center mounting bolt 610 in cooperation with a threaded port or nut 612.

It has been found that the snow shovel push blade assembly, when mounted on the multi-function wheelbarrow operates best with the wheels of the multi-function wheelbarrow lowered to the wheelbarrow position. In this case the lower edge of the push blade 602 is raised slightly above ground level whereby a user needs to tilt the wheelbarrow upwardly such that it pivots about the wheels and brings the front edge 603 of the push blade 602 into contact with the ground. The user then merely advances the wheelbarrow in a traditional manner keeping the push blade 602 in engagement with the ground and pushes snow that may be in contact therewith. The typical curve shape of the push blade allows snow to accumulate in front of the blade.

The snow that is accumulated on the blade can be pushed to the side of the driveway or to the side of an area being shoveled and the user can then quickly push down on the wheelbarrow handles causing the wheelbarrow to pivot at the base of the rear legs. This action causes the front of the wheelbarrow and the blade to pop upwardly quickly. The combination of the downward movement, the fast displacement of the front of the wheelbarrow and the resiliency of the blade, acts to partially distort the push blade and cause snow to be displaced upwardly and forwardly and separate from the blade. This assists in unloading of the snow shovel and displacing any snow a short distance in front of the push blade. Some distortion of the blade is desirable but not essential for snow separation.

The arrangement as shown in FIG. 16 is effective as the user is not directly supporting the shovel but is merely bringing the shovel into engagement with the surface to be plowed and then the wheelbarrow is advanced. The support is provided by the wheels of the wheelbarrow. This arrangement and the leverage possible by the rearwardly extending handles provides an effective arrangement for simplifying the plowing of snow and the subsequent displacement or discharge of the snow from the push blade.

The push blade 602 also includes a center forwardly extending section 640 that includes an open port 642 forming a handle portion. The handle portion is helpful in relocating the wheelbarrow or moving the wheelbarrow and the forwardly extending portion provides a support function as shown in FIG. 18. One of the problems associated with wheelbarrows in general is the amount of space required to store the wheelbarrow. If it is stored on the floor of a garage it can occupy a significant amount of space and may prevent the garage from being used for its intended purpose. Often wheelbarrows, because of their size, are stored outside perhaps behind a shed or other structure and essentially hidden from view. They can also be hung from a wall but this is not particularly convenient.

In the present system the multifunction wheelbarrow includes a pair of front wheels 650 either side of the wheelbarrow that are displaceable from a dolly use position to a wheelbarrow use position. The wheels 650 are movable rearwardly from the storage position shown in FIG. 18 to a wheelbarrow position shown in FIG. 16. This is typically carried out by a linkage associated with the rear legs 652 as described earlier in the application and in my earlier patent.

In order to reduce the space necessary to store the combination wheelbarrow and snow shovel it is designed to be stored vertically as shown in FIG. 18. The front edge 603 of the push blade 602 can engage the ground and the front edge 643 of the forwardly extending portion 640 can also engage the ground. This effectively provides a stable support arrangement for the wheelbarrow to allow it to be stored vertically as shown in FIG. 18. The wheels have been moved to the dolly position (preferred), however the device is also stable with the wheels in the wheelbarrow position. As can be appreciated, in the wheelbarrow position the amount of space required to store the snow shovel push blade and wheelbarrow is larger and the device is not as stable. Therefore it is anticipated and recommended that the storage position as shown in FIG. 18 be used.

It has been found that this arrangement allows the multifunction wheelbarrow to assist in what can often be a difficult task during the winter. Snow removal in northern climates can be quite difficult and lifting of snow can cause potential injuries associated with the back and/or legs and has been a factor in certain heart attacks caused by physical exertion.

With the present invention the snow shovel push blade is supported by the multifunction wheelbarrow and the user merely pushes the arrangement. When it is time to unload the snow shovel blade at the edge of a driveway one can merely push it to the edge or can push it to the edge and then quickly discharge the snow by pushing downwardly causing snow to be displaced. The stability of the wheels 650 either side of the multifunction wheelbarrow assist in providing a stable structure and one that is helpful to change and reduce the physical requirements for snow removal in a favorable manner.

Although it is possible to mount the snow blade in a number of different ways the one central bolt cooperating with an existing port in the multifunction wheelbarrow has a number of advantages. The U-shaped channel engaging the front of the wheelbarrow provides good support during the pushing of the snow and discharge of the snow from the blade. With this structure effective securement of the push blade to the multifunction wheelbarrow is achieved while it also allows simple removal if the user so chooses for example at the end of the winter season.

A significant advantage of the present system is that the structure of the multifunction wheelbarrow and particularly the frame thereof and wheels, are advantageously used to support the push blade and thus the cost of this arrangement is quite favorable relative to even the purchase of a snow shovel. For example, given that the user already has purchased the multifunction wheelbarrow the purchase of the additional snow shovel push blade assembly is comparable to the purchase of a reasonable quality snow shovel and the arrangement provides a number of significant advantages which can reduce the physical requirement for clearing of the snow during the winter months.

Although the push blade assembly has been described with respect to snow removal, it can also be used for moving other materials.

Although preferred embodiments of the invention have been described herein, it would be understood by those skilled in the art that variations may be made thereto and these variations are intended to be covered by the appended claims.

The embodiments of the invention in which an exclusive property or privilege is claimed are defined as follows:

1. A push blade assembly comprising
  a push blade made of a molded plastic material and having a curved front face with a lower ground engaging edge;
  said push blade including a mounting structure extending generally horizontally and rearwardly from a back face of said push blade; said mounting structure being generally parallel to said lower ground engaging edge and extending either side of a mid point in a length of said push blade;
  said mounting structure including upper and lower flanges defining a rearwardly opening 'U' shaped channel with a mechanical fastener passing through said upper and lower flanges adjacent a free edge thereof for drawing said flanges together during securement of said push blade assembly to a tubular frame component of a separate wheeled structure; wherein said push blade includes along a top edge thereof at least one forwardly extending flange, said at least one forwardly extending flange cooperating with said lower ground engaging edge to support said push blade with said 'U' shaped channel opening upwardly when said lower ground engaging edge and said at least one forwardly extending flange collectively support said push blade on a surface; and wherein said at least one forwardly extending flange includes a finger port configured to allow engagement of said push blade assembly.

2. A push blade assembly as claimed in claim 1 wherein said mechanical fastener is bolt and nut assembly.

3. A push blade assembly as claimed in claim 1 wherein said at least one forwardly extending flange is a single forwardly extending flange centrally located in a length of said push blade.

4. A push blade assembly as claimed in claim 1 wherein said at least one forwardly extending flange is a single forwardly extending flange; and said single forwardly extending flange includes a-said finger port configured to allow engagement of said push blade assembly.

5. A push blade assembly as claimed in claim 4 wherein said mechanical fastener includes a bolt member having a handgrip head for tightening of said bolt with a threaded nut portion.

6. A push blade assembly as claimed in claim 5 wherein said threaded nut portion is part of or retained by said lower flange allowing tightening of said mechanical fastener by rotation of said handgrip head.

7. A push blade assembly as claimed in claim 1 wherein said 'U' shaped channel is an integral part of said push blade.

8. A push blade as claimed in claim 7 wherein said 'U' shaped channel forms a horizontal reinforcing rib that is centrally positioned and extends over at least 75% of the length of the rear face.

9. A multi-function wheelbarrow comprising an elongate frame with a pair of non steerable wheels at one end thereof, a pair of side members extending from said one end towards a second end with said side members cooperating with said one end to support a load carrying container generally between and below said side members, said second end comprising a pair of removable handles aligned with said side members and extending away from said load carrying container;

said elongate frame at said one end including an end frame member exposed and extending across said multi-function wheelbarrow; said pair of non steerable wheels being movable between a first operating position with said wheels located behind said end frame and forward of said load carrying container and a second wheelbarrow operating position with said wheels located below said load carrying container; and a push blade assembly attached to said end frame member in front of said non steerable wheels;

said push blade assembly comprising a push blade made of a molded plastic material and having a curved front face with a lower ground engaging edge;

said push blade including a mounting structure extending rearwardly from a back face of said push blade and releasably secured to said one end;

said mounting structure including reinforcing members on said back face of said push blade strengthening said push blade with said reinforcing members engaging and being releasably mechanically secured to said one end to secure said push blade to said multi-function wheelbarrow;

said mounting structure including a bolt and nut type securement of said push blade to said multi-function wheelbarrow; and wherein said multi-function wheelbarrow with said push blade secured are movable to a snow push position by lifting up on said handles causing said elongate frame to pivot about said wheels and bring said lower ground engaging edge into contact with the ground.

10. A multi-function wheelbarrow as claimed in claim 9 wherein said wheelbarrow when said non-steerable wheels are in said second wheelbarrow operating position including a pair of downwardly extending support legs for engaging the ground and supporting said wheelbarrow in a self supporting position;

said wheelbarrow in said self supporting position positioning said ground engaging edge spaced from the ground and positioned substantially forwardly of said wheels.

11. A multi-function wheelbarrow as claimed in claim 10 wherein said mounting structure is generally parallel to said lower ground engaging edge and extends either side of a mid point in a length of said push blade and is attached to said end frame;

said mounting structure including upper and lower flanges defining a rearwardly opening 'U' shaped channel with a mechanical fastener passing through said upper and lower flanges adjacent a free edge thereof for causing said flanges to move towards each other and fixedly secure said push blade assembly to said end frame of said multi-function wheelbarrow.

12. A multi-function wheelbarrow as claimed in claim 11 wherein said push blade includes along a top edge thereof at least one forwardly extending flange, said at least one forwardly extending flange cooperates with said lower ground engaging edge to support said push blade with said 'U' shaped channel opening upwardly when said lower ground engaging edge and said at least one forwardly extending flange collectively support said push blade on a surface with said multi-function wheelbarrow in a vertical storage position.

13. A multi-function wheelbarrow as claimed in claim 12 wherein said at least one forwardly extending flange is a single forwardly extending flange centrally located in a length of said push blade.

14. A multi-function wheelbarrow as claimed in claim 12 wherein said mechanical fastener includes a threaded nut portion retained by said lower flange and said mechanical fastener includes a bolt portion with a handgrip head facilitating rotation of said bolt portion to secure said push blade assembly to said end frame member.

15. A multi-function wheelbarrow as claimed in claim 12 wherein said 'U' shaped channel is an integral part of said push blade.

16. A multi-function wheelbarrow as claimed in claim 15 wherein said 'U' shaped channel forms a horizontal reinforcing rib that is centrally positioned and extends over at least 75% of the length of the rear face.

\* \* \* \* \*